Jan. 19, 1960     T. ALBERS     2,921,670

AUTOMATIC FEEDING SYSTEM

Filed Dec. 31, 1957

INVENTOR.
TEUNIS ALBERS
BY *Fulwider Mattingly Huntley*
Attorneys 2,921,670
AUTOMATIC FEEDING SYSTEM Teunis Albers, Artesia, Calif.

Application December 31, 1957, Serial No. 706,406

4 Claims. (Cl. 198—213)

This invention relates generally to conveyer systems, and more particularly to a system for automatically distributing loose feed to animals, such as cows.

Due to the fact that a cow will more freely release milk during the milking process if fed during this period, it is customary in the dairy industry to feed a cow while the cow is being milked. To enable a milker to perform the milking process more speedily and more sanitarily, it has been proposed to provide apparatus for dispensing a proper amount of loose feed to a cow during the milking process. One such apparatus for dispensing feed is shown and described in United States Patent No. 2,706,581, issued April 19, 1955 to Teunis Albers.

Though the automatic feed-dispensing apparatus greatly facilitates the milking process, it is still necessary for a milker to individually fill the storage compartments of each dispensing apparatus prior to performing the milking process. The filling of these storage compartments requires considerable work and is therefore inconvenient and time consuming. For this reason, it would be very desirable to fill the storage compartments automatically from a central hopper, by means of a conveyer system. Various conveyer systems have been proposed in the past. A need remains for a conveyer system which is inexpensive and light weight, as well as being easy to manufacture and assemble. A conveyer system of this type may be integrated with other apparatus to form an improved feed-distributing system.

It is therefore a major object of this invention to provide a novel and improved automatic feed-distributing apparatus.

Another object of this invention is to provide an improved conveyer system.

An additional object of this invention is to provide a conveyer system which is more economical to manufacture and assemble than existing systems.

Still an additional object of this invention is to provide a conveyer system which is of more durable construction than existing systems.

These and other objects and advantages of the present invention will become apparent from the following description of a preferred form thereof and from the drawing illustrating that form in which.

In general, the present invention is directed to a feed-distributing system which incorporates an improved conveyer apparatus C, operating in conjunction with a dispensing apparatus D. The conveyer C includes conveyer boxes which are formed to have a U-shaped cross-section and sides which are turned back to form beads. The beads of the conveyer boxes are capable of engaging covers for the conveyer boxes in such a manner that the covers are held in position. A hanger for supporting a feed-moving apparatus in the conveyer boxes may also be supported by the beads of the boxes. Additionally, longitudinal rods may be fitted between the beads of abutting conveyer boxes to thereby form a number of boxes into a rigid self-supporting composite trough.

Figure 1:
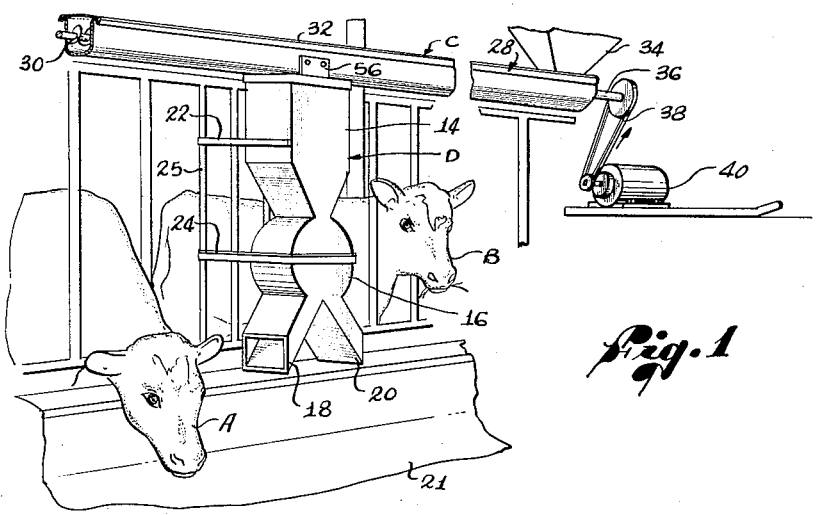
Figure 1 is a perspective view of a feed-distributing system constructed in accordance with the present invention.

Referring now in detail to the drawing, and particularly to Figure 1 thereof, the illustrated form of feed-distributing apparatus is adapted to be mounted to feed cows A and B. Positioned between the cows A and B is the feed-dispensing apparatus D which includes a storage compartment 14, a measuring chamber 16, and a pair of chutes 18 and 20. The feed-dispensing apparatus D may take various forms; however, one satisfactory form for the apparatus is shown and described in the above-referenced United States patent. The function of the apparatus D is to store feed in the storage compartment 14, and dispense the feed through the metering chamber 16 and one of the chute 18 or 20 into a feeding place 21. The feed may then be consumed by the cow A or B from the feeding place 21.

The feed-dispensing apparatus D is supported by brackets 22 and 24 which are attached between the apparatus D and stanchions, as the stanchion 25. Affixed above the storage compartment 14 of the feed-dispensing apparatus D is the conveyer apparatus C. The conveyer apparatus C includes a trough member 28, a conveyer screw 30 positioned in the trough 28 for moving feed through the trough, and a trough cover 32. The conveyer apparatus C is mounted to receive feed from a central storage hopper 34. Power to drive the conveyer screw 30 is applied to a shaft 36 which is connected to the screw 30. The shaft 36 is driven through a chain drive 38 by a motor 40.

Figure 2:
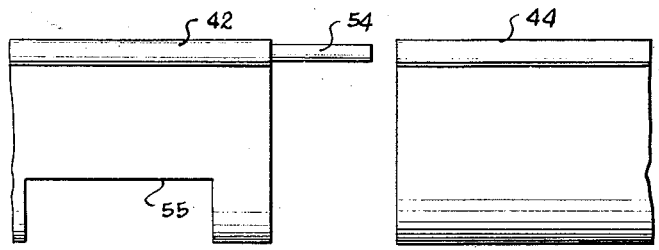
Figure 2 is a plan view of two mating sections or conveyer box which form the trough shown in Figure 1.
Figure 3:
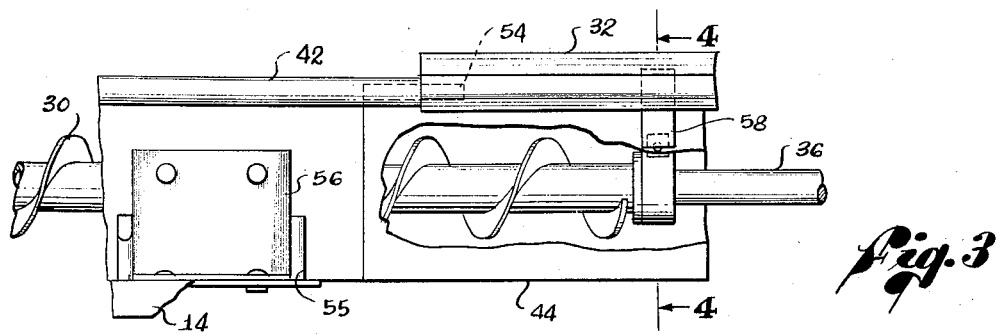
Figure 3 is a sectionalized plan view of a portion of the conveyer system shown in Figure 1.
Figure 4:
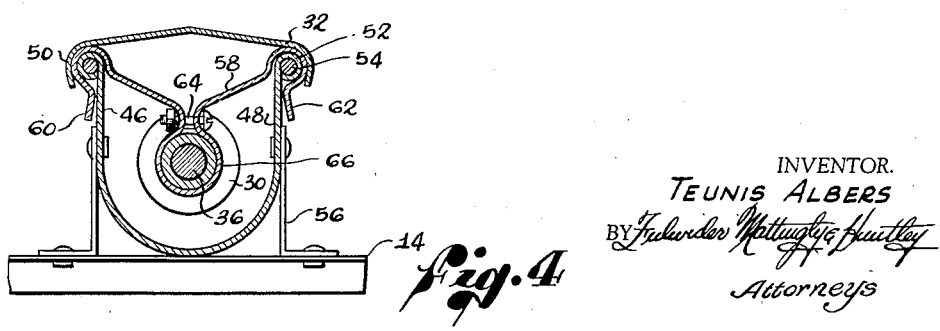
Figure 4 is a vertical sectional view taken along the line 4—4 of Figure 3.

The structural details of the conveyer apparatus C are best shown in Figures 2, 3 and 4. The trough member 28 is formed by a plurality of interconnected, longitudinally aligned, unitary conveyer boxes, such as conveyer boxes 42 and 44. These boxes are of a U-shaped configuration with side walls 46 and 48. The upper end of each of the side walls 46 and 48 terminate respectively, in beads 50 and 52. The beads 50 and 52 are formed by each of the side walls curving back upon itself to form a cylindrical cavity. The conveyer boxes 42 and 44 are interconnected by rigid steel rods 54, which are telescopically positioned in each of the cylindrical cavities of the beads of two abutting conveyer boxes.

The trough member 28 includes openings 55 positioned over feed-dispensing apparatus D. An angular bracket 56 is attached between the trough member 28 and the storage compartment 14 of the dispensing apparatus D, to maintain these elements in fixed relationship. The bracket 56 is affixed by being riveted to the side wall 48 of the trough, and to the top of the storage compartment 14.

The conveyer screw 30 is supported in the trough member 28 by a plurality of hangers 58. Each hanger 58 is formed of strap steel and is generally Y-shaped in configuration. The upper legs of the hangers are formed into two annular clamps 60 and 62 which pass over the beads 50 and 52 of the trough. The lower portion of the Y-shaped hanger 58 is held in a circular configuration about a bearing 66 by a bolt 64. The bearing 66 may be formed of nylon. The inside surface of the bearing supports the shaft 36 of the conveyer screw 30.

To assemble the conveyer apparatus C, the trough member 28 is first formed by interconnecting the conveyer boxes, as boxes 42 and 44, by inserting rods in the beads of abutting boxes. These rods penetrate each of the beads to sufficient depth to distribute the loading forces between the rods and the boxes. It is to be noted, that the structure of the boxes enables a simple assembly which results in a self-supporting trough having no rough edges or protuberances.

After the conveyer boxes have been formed into the trough member 28, the hangers 58, carrying the screw 30, are placed in the trough so that the clamps 60 and 62 engage the outside of the beads 50 and 52. In this manner the screw 30 is supported within the trough 28 by structural elements exceedingly simple to construct and assemble, and which maintains the screw rigid relative to the trough 28.

The trough covers 32 are then placed over the trough 28 in such a manner that the trough covers clamp about the exterior of the beads 50 and 52 and are thus held in position. The trough covers are flexed upwardly to a small extent as they are placed over the trough 28. This deformation urges the edges of the covers against the beads 50 and 52 so as to maintain the covers positively positioned upon the trough member.

It may be seen that the entire conveyer apparatus C may be quickly and easily assembled without using rivets or bolts or performing welding operations, and yet the apparatus is rigid and self-supporting.

In the use of the feeding system incorporating the present invention, the hopper 34 is filled with loose feed and the motor 40 is energized. The motor 40 then rotates the shaft 36 which in turn effects concurrent rotation of the conveyer screw 30. Rotation of the conveyer screw motivates the loose feed within the trough 28, moving it from a position below the hopper 34 to the dispensing apparatus D disposed beneath the conveyer apparatus C. In this manner, the storage compartment 14 of each dispensing apparatus D is filled, and stands ready to dispense loose feed to the cow A or B. The milker may then operate the dispensing apparatus at each milking station to selectively feed each cow as it is being milked.

In certain installations it may be possible to utilize gravity to move the feed within the channel of the conveyer system. In such an instance the feed-moving conveyer screw 30 may be eliminated.

An important feature of this invention is to provide an automatic-feeding apparatus for cows or other stock so that animals are automatically fed from a central storage bin.

Another important feature of the present invention is to provide an improved conveyer apparatus which may be simply and easily assembled or disassembled thereby enabling rapid and inexpensive installation and maintenance.

It should be noted that although the particular embodiment of the invention herein shown and described is fully capable of providing the advantages and achieving the objects previously set forth, such embodiment is merely illustrative of this invention and therefore modifications and changes may be made thereto without departing from the spirit of the invention or the scope of the following claims.

I claim:

1. A conveyer trough for supporting loose material as the material is moved along said trough by a loose-material-moving apparatus comprising: a unitary longitudinal conveyer box including a bottom and substantially parallel side walls, said side walls being turned back upon themselves at the edges thereof to thereby form closed beads; and a hanger for supporting said loose-material-moving apparatus at certain locations along said trough, said hanger including a pair of clamps for clamping about the beads of said box and a bearing affixed to said clamps to thereby support said material-moving apparatus within said box.

2. A conveyer trough for supporting loose material as the material is moved along said trough by a loose-material-moving apparatus comprising: a unitary longitudinal conveyer box including a bottom and substantially parallel side walls, said side walls being turned back upon themselves to thereby form closed beads; a hanger for supporting said loose-material-moving apparatus, said hanger including a pair of clamps for clamping about the beads of said box to thereby support said material-moving apparatus within said box; and a unitary longitudinal cover including a substantially flat section for bridging said beads, and a pair of sections extending away from said flat section for clamping over said beads to thereby hold said cover affixed to said box.

3. A conveyer trough for supporting loose feed, as the feed is moved along said trough by a feed-moving apparatus, comprising: a plurality of longitudinal unitary conveyer boxes each including a bottom and side walls, said side walls being turned back upon themselves at the edges thereof to thereby form beads; a plurality of longitudinal unitary covers each including a substantially flat section for bridging the beads of said boxes, and a pair of sections extending generally perpendicularly away from said flat section for clamping over said beads to thereby hold said covers affixed to said boxes; at least one hanger for supporting said loose-material-moving apparatus, said hanger including a pair of clamps for clamping about the beads of said box and a bearing affixed to said clamps to thereby support said material-moving apparatus within said box; and a plurality of longitudinal rods each positioned in a pair of the beads of adjoining boxes to thereby interconnect said boxes in a supporting manner.

4. A conveyer system for loose material comprising: a plurality of longitudinal unitary conveyer boxes each including a bottom and substantially parallel side walls, said side walls being turned back upon themselves at the edges thereof to thereby form beads; means to interconnect said boxes in a supporting manner; a plurality of longitudinal unitary covers each including a substantially flat section for bridging the beads of said boxes, and a pair of curved sections extending generally-perpendicularly away from said flat section for clamping over said beads to thereby hold said covers affixed to said boxes; a conveyer screw material-moving apparatus, adapted to be revolved to effect movement of loose material; a hanger for supporting said loose-material-moving apparatus, said hanger including a pair of clamping sections for clamping about the beads of said box and a bearing affixed to said clamping sections to thereby support said material-moving apparatus within said box.

References Cited in the file of this patent

UNITED STATES PATENTS

| | | |
|---|---|---|
| 2,004,852 | Coyle | June 11, 1935 |
| 2,038,471 | Benatar | Apr. 21, 1936 |
| 2,459,770 | Escher | Jan. 18, 1949 |
| 2,513,784 | Blomquist | July 4, 1950 |
| 2,524,948 | Whitney | Oct. 10, 1950 |
| 2,571,637 | Weist | Oct. 16, 1951 |
| 2,656,036 | Whitney | Oct. 20, 1953 |
| 2,718,296 | Johnson | Sept. 20, 1955 |